United States Patent [19]

Stacy

[11] 4,390,648

[45] Jun. 28, 1983

[54] REINFORCED RUBBERY COMPOSITION

[75] Inventor: Carl J. Stacy, Bartlesville, Okla.

[73] Assignee: Phillips Petroleum Company, Bartlesville, Okla.

[21] Appl. No.: 158,652

[22] Filed: Jun. 11, 1980

[51] Int. Cl.$^3$ ............................ C08K 9/00; C08K 3/34; C08K 3/10

[52] U.S. Cl. .................................... 523/216; 524/434; 524/443; 524/566; 524/570; 524/571; 524/575; 260/726; 260/768 R; 260/775

[58] Field of Search ............ 260/23.7 M, 42.14, 42.15, 260/768 R, 726, 775; 524/434, 443, 575, 571, 570, 566; 523/216

[56] References Cited

U.S. PATENT DOCUMENTS

| | | | |
|---|---|---|---|
| 2,583,326 | 1/1952 | D'Alelio | 260/78.5 |
| 3,014,005 | 12/1961 | Howland et al. | 260/41.5 |
| 3,228,883 | 1/1966 | Giullo et al. | 252/63.2 |
| 3,325,429 | 6/1967 | Harris | 260/23.7 M |
| 3,591,494 | 7/1971 | Croach et al. | 210/40 |
| 3,768,537 | 10/1973 | Hess et al. | 260/448.8 R |
| 3,928,270 | 12/1975 | South | 260/23.7 M |

OTHER PUBLICATIONS

Chem. Abs. vol. 81-170861w (1974) Duchaeek et al., "Effect of Aerosil on the Course of Thiuram Accelerated Sulfur Vulcanization".
Chem. Abst. vol. 68-79412w (1968) Vulcanization Accelerator.
Chem. Abst. vol. 73-56985z (1970) Kuettner et al., "Zinc Silicate Accelerator for Rubber Vulcanization" DD-070391.
Chem. Abst. vol. 92-148275p (1980) Vulcanization Mixtures, Sayamyan et al., SU-713880.

*Primary Examiner*—John C. Bleutge
*Assistant Examiner*—Herbert J. Lilling

[57] ABSTRACT

In a rubbery composition in which a silica containing material is utilized as a reinforcing agent, the hysteresis of the rubbery composition is improved by incorporating the silica containing material into the rubbery composition in the form of zinc modified silica. The zinc modified silica provides an improved reinforcing agent which improves the hysteresis of the rubbery composition when the rubbery composition containing the zinc modified silica is cured.

13 Claims, No Drawings

REINFORCED RUBBERY COMPOSITION

This invention relates to reinforced rubbery composition. In one aspect this invention relates to a method for improving the hysteresis of a cured rubbery composition. In another aspect this invention relates to a novel silicon-containing reinforcing agent for rubbery compositions.

Reinforcing agents have been added to rubbery compositions for many years to increase the hardness, stiffness, strength, hysteresis and resistance to cutting, tearing and abrasion of the cured rubbery compositions. Carbon blacks have generally been employed as the reinforcing agent in rubbery compositions primarily because the carbon black reinforcing agent has been the most satisfactory known reinforcing agent readily available. However, due to an increasing demand for light colored and white rubbery articles and due to the increasing cost and shortage of petroleum feedstocks for making carbon black, a need has arisen for an alternate, high performance, light colored reinforcing agent.

Finely divided silicon-containing materials have been used as reinforcing agents in place of carbon black. The silicon-containing materials are light colored and the use of the silicon-containing reinforcing agents results in rubbery compositions which have been found to be satisfactory for many purposes. However, the hysteresis of rubbery compositions which utilize silicon-containing materials, in general, needs to be improved to reduce energy losses and improve fuel economy.

It is thus an object of this invention to provide a method for improving the hysteresis of a cured rubbery composition when a silicon-containing material is utilized as the reinforcing agent. It is another object of this invention to provide a novel silicon-containing reinforcing agent for rubbery compositions.

As used herein and as generally used in the art, the term "hysteresis" refers to two properties of the rubbery composition, heat build up and resilience. Improved hysteresis is evidenced by a lower heat build up and a higher resilience.

In accordance with the present invention a zinc modified silica is utilized as the reinforcing agent in a rubbery composition. The zinc modified silica is formed by adding a suitable acidic material to an alkali metal silicate solution to thereby precipitate silica from the alkali metal silicate solution. After the precipitation of the silica is substantially complete, a suitable zinc salt is added to the solution to thereby form the zinc modified silica. The amount of the acidic material added to the rubber alkali metal silicate solution is less than the stoichiometric amount of the acidic material required to completely neutralize the alkali metal oxide which is present in the alkali metal silicate solution. This allows the zinc to be incorporated into the silica resulting in what is referred to herein as zinc modified silica.

It is believed that the addition of the zinc salt after the precipitation of the silica is substantially complete results in a fixing of the zinc atoms at the surface of the silica. It is further believed that the presence of the zinc atoms at the surface of the silica result in an improved bonding between the silica and the rubbery polymer in the rubbery composition when the rubbery composition is cured and that this improved bonding between the rubbery polymer and the silica results in a cured rubbery composition having improved hysteresis.

Other objects and advantages of the invention will be apparent from the foregoing brief description of the invention and the claims as well as from the detailed description of the invention which follows.

The rubbery composition of the present invention comprises a rubbery polymer and a zinc modified silica reinforcing agent. Preferably a sulfur containing organosilicon reinforcing promoter or coupling agent is also present in the rubbery composition. Conventional additives such as vulcanizing agents, activators, antioxidants, plasticizers, colorants, and the like may also be present in the rubbery composition.

Any suitable rubbery polymer may be utilized in the present invention. As used herein the term rubbery polymer refers to a material that is capable of recovering from large deformations quickly and forcibly and can be, or already is, modified to a state in which it is essentially insoluble (but can swell) in boiling solvents such as benzene, methyl ethyl ketone, and ethanol-toluene azeotrope. A rubber in its modified state, free of diluents, retracts within one minute to less than 1.5 times its original length after being stretched at room temperature (18 to 29C) to twice its length, and held for one minute before release (ASTM D-1566-76). Examples of suitable rubbery polymers include natural rubber, butadiene-styrene copolymers, isoprene-styrene copolymers, butadiene-acrylonitrile copolymers, polybutadiene, polyisoprene, ethylene-propylene-diene terpolymers, butyl rubber and the like and mixtures of any two or more thereof.

The zinc modified silica suitable for use in the present invention is produced by the addition of a water soluble, organic or inorganic zinc salt during the latter stages of acid precipitation of silica from an aqueous solution of an alkali metal silicate. Any suitable zinc salt may be utilized. Suitable zinc salts include zinc chloride, zinc bromide, zinc iodide, zinc nitrate, zinc sulfate, zinc ethyl sulfate, zinc formate, zinc hexafluorosilicate, zinc salicylate and the like and mixtures of any two or more thereof.

Any suitable alkali metal silicate may be utilized to prepare the zinc modified silica. Suitable alkali metal silicates may have varying proportions of the alkali metal oxide to the silicon dioxide. For example, "N" brand sodium silicate (Philadelphia Quartz Co.) is sold in the form of an aqueous solution of about 38% solids content, in which the ratio $Na_2O:SiO_2$ is about 1:3.2. "RU" brand sodium silicate (Philadelphia Quartz Company) is sold in the form of a 47% aqueous solution in which the ratio $Na_2O:SiO_2$ is about 1:2.4. "KaSil No. 1" brand potassium silicate (Philadelphia Quartz Co.) is sold in the form of a 27% aqueous solution in which the ratio $K_2O:SiO_2$ is about 1:2.5. Other commercial alkali metal silicates have ratios of alkali metal oxide to silicon dioxide of 1:1.6, 1:2.0, 1:2.9, 1:3.75. Various other silicates, such as sodium metasilicate ($Na_2O.SiO_2$) and ordinary water glass ($Na_2O.4SiO_2$) may be used. Such alkali metal silicates are highly alkaline.

Acid precipitation of silica from an aqueous solution of an alkali metal silicate is a well known and commercially practiced process. Acid precipitated silicas are finally divided and have uniform particle size. A particularly important feature of acid precipitated silicas is the large surface area which makes the acid precipitated silicas suitable for use as a reinforcing agent for rubbery compositions. In general, the acid precipitation of silica from an aqueous solution of an alkali metal silicate is accomplished by adding an acidic material to the alkali metal silicate solution. Precipitation of the silica usually begins after addition of about 30% of the acidic material required to neutralize the alkali metal oxide content of the alkali metal silicate. Precipitation of the silica is essentially complete after about 40-70% of the acidic material required to neutralize the alkali metal oxide content of the alkali metal silicate has been added to the alkali metal silicate solution. Generally precipitation begins when the ratio of silicon dioxide to alkali metal oxide has been increased to about 5 as a result of partial neutralization of the alkali metal oxide. Precipitation will generally be complete when the silicon dioxide to alkali metal oxide ratio has increased to about 10. The amount of the acidic material used would generally be substantially the stoichiometric amount of the acidic material required to react with the alkali metal oxide of the alkali metal silicate to produce the neutral or normal salt as distinguished from the acid salt.

The standard procedure for precipitating silica from aqueous alkali metal silicate solutions is modified to form the zinc modified silica of the present invention. An acidic material is added to the aqueous solution of the alkali metal silicate to precipitate the silica but the amount of the acidic material added is less than the stoichiometric amount of the acidic material required to completely neutralize the alkali metal oxide present in the alkali metal silicate solution. After the precipitation of the silica is substantially complete the suitable zinc salt is added to the solution formed by the adding of the acidic material to the alkali metal silicate solution. An ion exchange between the unneutralized alkali metal and the zinc occurs which effectively associates the zinc with the silica. Addition of the zinc after the precipitation of the silica is substantially complete results in the zinc being fixed on the outside of the silica particles. When the thus formed zinc modified silica is added to the rubbery polymer the zinc is present at the interface between the silica and the rubbery polymer. It is believed that the presence of the zinc at the interface between the silica and rubbery polymer results in enhanced cure of the rubbery polymer adjacent to the silica which improves the hysteresis of the resulting rubbery composition, particularly with use of a coupling agent which would enhance bonding of the silica to the rubbery polymer.

Any suitable amount of the acidic material can be utilized in preparing the zinc modified silica. The amount of acidic material which is used in preparing the zinc modified silica is generally the amount wherein the ratio of alkali metal oxide equivalents: acid equivalents is greater than 1:1, preferably within the range of 5:1 to 1.05:1. The amount of acidic material added will generally determine the amount of zinc modification which can occur. The level of zinc modification, i.e., the weight percent zinc present in the zinc-modified silica, can be any amount desired for a specific end-use requirement, and is typically determined by the relative amounts of silica and zinc activator (typically added in a normal recipe as zinc oxide) required in a given compounding recipe. Typically, the equivalents of acid plus the equivalents of zinc will be at least equal to the equivalents of alkali metal silicate from which the zinc-modified silica is being precipitated.

Addition of the acidic material and the zinc salt is preferably conducted while the aqueous alkali metal silicate solution is being mechanically stirred. The aqueous alkali metal silicate solution may be maintained at any suitable temperature. Preferably the aqueous alkali metal silicate solution is maintained at a temperature in the range of about 25° C. to about 100° C. and is more preferably maintained at a temperature in the range of about 80° C. to about 100° C.

After the desired amount of the acidic material and zinc salt has been added to the aqueous alkali metal silicate solution to form the zinc modified silica, the aqueous slurry of precipitated zinc modified silica is preferably heat treated at a temperature in the range of about 80° C. to about 100° C. for a time in the range of about 30 minutes to about 2 hours. After the heat treatment over a period of time the zinc modified silica can be recovered by settling or filtration.

The recovered zinc modified silica is then preferably washed with water and/or alcohol to remove the displaced alkali metal ion, anion from the zinc compound and remove the anion from the acidic precipitating agent.

Acidic materials which can be used for acidification of the aqueous alkali metal silicate solutions include hydrochloric acid, sulphuric acid, sulphurous acid, nitric acid, and acetic acid, as well as the acid or partially neutralized alkali metal or ammonium salts of acids, such as sodium bicarbonate, ammonium bicarbonate, sodium hydrogen sulphate, disodium hydrogen phosphate, and the like. Any other acidic material which reacts with alkali metal silicate to neutralize the alkali thereof also may be used. Gaseous acids or acid anhydrides such as $SO_2$, HCl, $H_2S$, $CO_2$, chlorine, and the like can be used and offer the advantage that problems which arise, due to dilution which occurs when aqueous acidic solutions are used, are not encountered. Normally, the acidic materials used are mineral acids or their acidic salts although any acidic material capable of reacting with aqueous alkali can be used.

Any suitable sulfur containing organosilicon reinforcing promoter may be included in the rubbery composition if desired. Suitable sulfur containing organosilicon reinforcing promoters may be represented by the general formulas I and II as follows:

$$R_{3-n}R'_nSi-Q-S_x-Q-Si-R'_nR_{3-n} \quad (I)$$

and $$R_{3-n}R'_nSi-Q-Z \quad (II)$$

wherein R is hydroxy, alkoxy, cycloalkoxy, aryloxy, halogen, or combinations thereof, the hydrocarbonoxy radicals having 1 to about 10 carbon atoms: R' is alkyl, cycloakyl, aryl, or combinations thereof, having 1 to about 10 carbon atoms; n is 0, 1, or 2; Q is alkylene, cycloalkylene, arylene, or combinations thereof, having 1 to about 10 carbon atoms; x is 2 to about 6; and Z is a sulfur containing radical, such as —SH, —$SR^2$, —SCN, —S—CS—$OR^2$, —S—CS—$SR^2$, —S—CS—$NR^3R^4$, —S—S—CS—$NR^3R^4$, —S—O—R', and —S—S—$NR^3R^4$, wherein $R^2$ is a monovalent organic group including saturated or unsaturated branched or straight chain, acyclic or cyclic hydrocarbon, heterocyclic, or heteroaromatic group having 1 to about 15 carbon atoms and which can have 1 to about 5 heteroatoms; and $R^3$ and $R^4$ are the same or different and are hydrogen, alkyl of 1 to about 3 carbon atoms, benzyl, cycloalkyl with 5 to 7 carbon atoms, or both together with the nitrogen atom form a ring having 5 to about 8 atoms with up to one further nitrogen, oxygen, or sulfur atom. Examples include: 3,3'-bis(trimethoxysilylpropyl)disulfide, 3,3'-bis(triethoxysilylpropyl)tetrasulfide, 2-mercaptoethyl(trimethoxy)silane, allylthiopropyl(trimethoxy)silane, 3-thiocyanopropyl(tripropoxy)silane, 3-tributoxysilylpropyl ethyl xanthogenate, 3-triethoxysilylpropyl isobutyl thioxanthogenate, 3-trimethoxysilylpropyl N-ethyldithiocarbamate, 4-tripropoxysilylbutyl N,N-dicyclohexyldithiocarbamate, 3-(trimethoxysilyl)propylsulfenyl dimethyldithiocarbamate, ethyl 3-(trimethoxysilyl)ethylthiosulfenamide and the like and mixtures of any two or more thereof.

Any suitable conventional vulcanizing agent, activator, antioxidant, plasticizer, colorant, extender, accelerator, etc. can also be present in the rubbery composition if desired. Examples of conventional additives for rubbery compositions include sulfur, 4,4'-dithiomorpholine, zinc oxide, tellurium, selenium, 2-mercaptobenzothiazole, tetramethylthiuram disulfide, diphenyl guanidine, benzothiazyl disulfide, N-cyclohexyl-2-benzothiazolesulfenamide, copper dimethyldithiocarbamate, and stearic acid. A suitable formulation for the rubbery composition of the present invention is as follows. The formulation is based on 100 parts by weight of the rubbery polymer. Both a broad range and a preferred range are given.

| Ingredients | Parts by Weight | |
|---|---|---|
| | Broad | Preferred |
| Rubber polymer | 100 | 100 |
| Zinc-modified silica | 5 to 120 | 25 to 100 |
| Organosilicon reinforcing promoter | 0 to 40 | 0 to 10 |
| Rubber extender oil | 0 to 100 | 0 to 65 |
| Vulcanizing agent | 0 to 20 | 1 to 10 |
| Accelerators | 0 to 10 | 1 to 5 |
| Activators | 0 to 15 | 0.5 to 10 |

Compounding of the rubbery composition may be accomplished using any of the conventional techniques known and used in the art. Typical techniques generally involve melt blending in a mixer such as a Banbury mixer. The order of addition of the various ingredients is not critical. Typically, the rubbery polymer, the zinc modified silica, and the organosilicon reinforcing promoter, if used, are charged initially and individually to the mixing device followed by the rubber extender oil vulcanizing agent, accelerators and activators, if used. Alternatively, the organosilicon reinforcing promoter can be mixed with the zinc modified silica prior to adding the resulting mixture to the rubbery polymer.

The compounded rubbery compositions can be cured (vulcanized) under any suitable conditions of time, temperature, and pressure. The choice of conditions will generally depend on the nature of the rubbery polymer, the reactivity and amount of curatives (vulcanizing agents and accelerators) employed and the size (thickness) of the rubbery article being cured. These factors are well recognized in the art and the skilled worker can readily determine the most suitable conditions by a few well chosen experiments for his particular circumstances. However, suitable curing is generally achieved from about 50° to about 250° C. for a few seconds up to about 6 hours under pressures ranging from atmospheric up to about 1,000 psig.

Fields of use for the rubber compositions of this invention include, for example, industrial rubber articles such as cable insulation, hoses, driving belts, V-belts, conveyor belts, roller coating, vehicle tire treads, tire carcasses, tire sidewalls, shoe sole materials, packing rings, damping elements and many others.

The following examples are presented in further illustration of the present invention.

EXAMPLE I

This example illustrates the preparation of zinc-modified silica and its evaluation as a reinforcing promoter for SBR (styrene/butadiene rubber).

Two hundred eighty-six grams of water glass (aqueous solution of sodium silicate having a density of 1.38 g/mL, 40°–42° Be', and 29.3 weight percent $SiO_2$ by analysis) was diluted with 1260 mL of water and placed in a 2 liter flask. The resulting solution was stirred at 160 rpm (mechanical stirrer) and maintained at a temperature of 100° C. while 200 mL of 3 M hydrochloric acid was added to the solution at a rate of 2 mL per minute. Following addition of the hydrochloric acid, 80 mL of a solution of 1.5 M zinc chloride was added with continued stirring at the same rate and temperature as used for the acid addition. Following completion of the addition of the zinc chloride solution, the resulting slurry was allowed to cool to about 25° C. with continued stirring for about 15 hours. The pH of the resulting slurry was 6.5. The zinc-modified silica was separated by filtration, washed once with water, then twice with isopropyl alcohol, and dried for about 15 hours at 105° C. at reduced pressure. Analysis indicated the zinc-modified silica contained 6.7 weight percent zinc and had a surface area of 82 $m^2/g$ as determined with gaseous nitrogen according to the known BET procedure, and a surface area of 114 $m^2/g$ as determined using cetyltrimethylammonium bromide (CTAB) according to the procedure described in ASTM Standard D 3765-79.

Non-modified control silicas were prepared using 3 M hydrochloric acid only (no zinc chloride added) at slightly different addition rates and/or aging conditions that those used for preparing the zinc-modified silica which resulted in different surface areas as set forth in Table II. The different surface areas were accounted for as set forth in footnote (a) for Table II. The precipitated zinc-modified silica, precipitated control non-modified silicas, and a commercial control, Hi-Sil 233 hydrated silica (PPG Industries), were evaluated for their efficiency as reinforcing fillers, both with and without a reinforcing promoter, in the standard SBR recipe shown in Table I.

TABLE I

| SBR Recipe for Evaluating Reinforcement by Silica | |
|---|---|
| Ingredient | Parts by Weight |
| SBR[a] | 100 |
| Silica or zinc-modified silica | 40 |
| Si-69[b] | 0 or 1.5 |
| Zinc oxide | 4.0 |
| Stearic acid | 2.0 |
| Sulfur | 2.75 |
| Diphenylguanidine[c] | 1.5 |
| Benzothiazyl disulfide[c] | 1.5 |

[a]76.5/23.5 Butadiene/styrene emulsion polymerized copolymer.
[b]Reinforcing promoter having the structure bis(3-triethoxysilylpropyl) tetrasulfide.
[c]Cure accelerator.

Properties of the compounded stocks prepared according to this recipe, cured for 30 minutes at 320° F. (160° C.) and containing either precipitated zinc-modified silica, precipitated control non-modified silicas, or commercial hydrated silica are shown in Table II.

TABLE II

Properties[a] of Silica Reinforced Rubber[b]

| Run | Silica Type | Total Zinc In Compounded Stock, phr[c] | Promoter | CTAB Surface Area, m²/g | ΔT, °C.[d] | Hysteresis Resilience, %[e] | Tensile Strength, MPa[f] | 300% Modulus[f] | ML-4[g] |
|---|---|---|---|---|---|---|---|---|---|
| 1 | Zinc-modified silica | 5.9 | None | 114 | 22.2 | 77.4 | 14.3 | 4.6 | 36 |
| 2 | Commercial control[h] | 3.2 | None | 150 | | | | | |
| 3 | Non-modified silica control | 3.2 | None | 84 | | | | | |
| 4 | Non-modified silica control | 3.2 | None | 214[a] | 28 | 72 | 18 | 6 | 47 |
| 5 | Non-modified silica control | 3.2 | None | 36 | | | | | |
| 6 | Zinc-modified silica | 5.9 | Si-69[i] | 114 | 18.1 | 79.3 | 16.9 | 12.4 | 36.5 |
| 7 | Commercial control[h] | 3.2 | Si-69[i] | 150 | | | | | |
| 8 | Non-modified silica control | 3.2 | Si-69[i] | 84 | | | | | |
| 9 | Non-modified silica control | 3.2 | Si-69[i] | 214[a] | 23 | 75 | 22.5 | 13.5 | 38 |
| 10 | Non-modified silica control | 3.2 | Si-69[i] | 36 | | | | | |

[a]The hysteresis, tensile, and Mooney viscosity values listed for the controls are interpolated values at a CTAB surface area of 114 from the smooth curve obtained by plotting the properties of the four individual control samples versus their surface areas. Properties imparted by a reinforcing filler are a function of the surface area, and thus the need to compare properties at a given surface area. A control was not available having a CTAB surface area of 114 m²/g, the surface area of the zinc-modified silica used in the invention compositions.
[b]See Table I for formulation.
[c]phr = Parts per 100 parts of rubber
[d]ASTM D623-67.
[e]ASTM D945-72.
[f]ASTM D412-75.
[g]ASTM D1646-74.
[h]Hi-Sil 233 hydrated silica (PPG Industries).
[i]See Table I, footnote (b).

These data illustrate that compounded SBR stock containing zinc-modified silica, both without and with reinforcing promoter, (Runs 1 and 6 respectively) have lower heat build-up (ΔT°, C) and better resilience than the corresponding commercial (Runs 2 and 7) or non-modified (Runs 3, 4, 5, and 8, 9, 10) silica-containing controls. The incorporation into the recipe of a reinforcing promoter is shown to result in higher tensile strength, 300% modulus, and Mooney viscosity (ML-4) with both the zinc-modified and the control silicas. Thus, zinc-modified silica imparts improved heat build-up and resilience properties to compounded stock regardless of the presence of a sulfur-containing organosilicon reinforcing promoter. The presence of the sulfur-containing organosilicon reinforcing promoter does provide for improved tensile and Mooney viscosity properties, if these properties are desired.

EXAMPLE II

This example illustrates the evaluation of compounded stocks containing zinc-modified silica and non-modified silica wherein the quantities of the added zinc-modified silica and zinc oxide have been adjusted so that the total zinc content and the silica content of the inventive composition and the control composition are essentially the same.

A second batch of zinc-modified silica was prepared according to the procedure described in Example I and was found by analysis to contain 6.3 weight percent zinc and to have a surface area of 91 m²/g as determined with gaseous nitrogen, and a surface area of 112 m²/g as determined using CTAB. An inventive composition and a control composition were compounded according to the recipes shown in Table III. The stocks were cured for 30 minutes at 320° F. (160° C.).

TABLE III

Recipes Having the Same Zinc and the Same Silica Content

| Ingredient | Run 11 Parts by Weight | | Run 12 | |
|---|---|---|---|---|
| SBR[a] | 100 | | 100 | |
| Zinc-modified silica (zinc content) | 42.68 | (2.69) | 0 | |
| Hi-Sil 233 silica | 0 | | 40 | |
| Zinc oxide (zinc content) | 0.65 | (0.52) | 4.0 | (3.21) |
| Si-69 | 1.5 | | 1.5 | |
| Stearic acid | 2.0 | | 2.0 | |
| Sulfur | 2.75 | | 2.75 | |
| Diphenylguanidine | 1.5 | | 1.5 | |
| Benzothiazyldisulfide | 1.5 | | 1.5 | |

[a]76.5/23.5 Butadiene/styrene emulsion polymerized copolymer.

TABLE IV

Properties[a] of Silica-Reinforced Vulcanized Rubber Having The Same Zinc and Silica Contents

| Run | Silica Type | Total Zinc In Compounded Stock, phr | CTAB Surface Area m²/g | ΔT, °C. | Hysteresis Resilience, % | Tensile Strength MPa | 300% Modulus | ML-4 |
|---|---|---|---|---|---|---|---|---|
| 11 | Zinc-modified silica | 3.2 | 112 | 18.0 | 75.9 | 13.1 | (b) | 40.5 |

TABLE IV-continued

Properties[a] of Silica-Reinforced Vulcanized Rubber Having The Same Zinc and Silica Contents

| Run | Silica Type | Total Zinc In Compounded Stock, phr | CTAB Surface Area m²/g | Hysteresis ΔT, °C. | Resilience, % | Tensile Strength MPa | 300% Modulus | ML-4 |
|---|---|---|---|---|---|---|---|---|
| 12 | commercial | 3.2 | 150 | 22.4[a] | 74.3[a] | 22.5[a] | 13.8[a] | 38[a] |

[a]Hysteresis, tensile, and viscosity values listed for the control are interpolated values at a CTAB surface area of 112 from the smooth curve obtained by plotting the individual properties of a series of samples containing non-modified silica versus their respective surface areas. The absolute values observed for control Run 12 fell on the smooth curve. This interpolation is necessary since properties imparted by a reinforcing filler are a function of the surface area.
[b]Not determined.

These data confirm the data in Example I which showed that zinc-modified silica imparts improved heat build-up and resilience properties to vulcanized rubber compositions, and further shows that zinc bound to the silica is more effective in enhancing these properties than zinc added as zinc oxide.

While the invention has been described in terms of the presently preferred embodiment, reasonable variations and modifications are possible by those skilled in the art, within the scope of the described invention and the appended claims.

That which is claimed is:

1. A method for improving the hysteresis of a rubbery composition comprising a rubbery polymer and a silicon containing reinforcing agent, said method comprising the steps of:
    adding said silicon containing reinforcing agent to said rubbery polymer in the form of zinc-modified silica which is formed by the steps of adding a suitable acidic material to an alkali metal silicate solution to thereby precipitate silica from said alkali metal silicate solution, adding a suitable zinc salt to the solution formed by the adding of said acidic material to said alkali metal silicate solution to thereby form said zinc modified silica, wherein less than the stoichiometric amount of said acidic material, which would be required to completely neutralize the alkali metal oxide which is present in said alkali metal silicate solution, is added to said alkali metal silicate solution, and wherein said zinc salt is added to the solution formed by the adding of said acidic material to said alkali metal silicate solution after the precipitation of silica from said alkali metal silicate solution is substantially complete; and
    curing said rubbery composition.

2. A method in accordance with claim 1 wherein said rubbery composition is cured by heating said rubbery composition to a temperature in the range of about 50° C. to about 250° C. at a pressure in the range of about 1 atmosphere to about 1,000 psig for a time period ranging from a few seconds up to about 6 hours.

3. A method in accordance with claim 1 wherein said alkali metal silicate solution is stirred while said suitable acidic material is added to said alkali metal silicate solution, wherein said alkali metal silicate solution is maintained at a temperature in the range of about 25° C. to about 100° C. while said suitable acidic material is being added to said alkali metal silicate solution, wherein the solution formed by the adding of said acidic material to said alkali metal silicate solution is stirred while the suitable zinc salt is added to the solution formed by the adding of said acidic material to said alkali metal silicate solution and wherein the solution formed by the adding of said acidic material to said alkali metal silicate solution is maintained at a temperature in the range of about 25° C. to about 100° C. while said suitable zinc salt is added to the solution formed by the adding of said acidic material to said alkali metal silicate solution.

4. A method in accordance with claim 1 wherein said alkali metal silicate solution is stirred while said suitable acidic material is added to said alkali metal silicate solution, wherein said alkali metal silicate solution is maintained at a temperature in the range of about 80° C. to about 100° C. while said suitable acidic material is being added to said alkali metal silicate solution, wherein the solution formed by the adding of said acidic material to said alkali metal silicate solution is stirred while the suitable zinc salt is added to the solution formed by the adding of said acidic material to said alkali metal silicate solution and wherein the solution formed by the adding of said acidic material to said alkali metal silicate solution is maintained at a temperature in the range of about 80° C. to about 100° C. while said suitable zinc salt is added to the solution formed by the adding of said acidic material to said alkali metal silicate solution.

5. A method in accordance with claim 1 wherein the steps of forming said zinc modified silica additionally comprise:
    heating the solution containing said zinc modified silica to a temperature in the range of about 80° C. to about 100° C. for a time period in the range of about 30 minutes to about 2 hours after the addition of said suitable zinc salt is completed;
    recovering said zinc modified silica from the solution containing said zinc modified silica; and
    washing the thus recovered zinc modified silica.

6. A method in accordance with claim 1 wherein said rubbery composition additionally comprises a sulfur containing organosilicon reinforcing promoter.

7. A method in accordance with claim 6 wherein said rubbery composition additionally comprises a rubber extender oil, a vulcanizing agent, at least one accelerator and at least one activator.

8. A rubbery composition comprising a rubbery polymer selected form the group consisting of natural rubber, butadiene-styrene copolymers, isoprene-styrene copolymers, butadiene-acrylonitrile copolymers, polybutadiene, polyisoprene, ethylene-propylene-diene terpolymers, butyl rubber and mixtures of any two or more thereof and zinc-modified silica which is formed by the steps of adding a suitable acidic material to an alkali metal silicate solution to thereby precipitate silica from said alkali metal silicate solution, and adding a suitable zinc salt to the solution formed by the adding of said acidic material to said alkali metal silicate solution to thereby form said zinc modified silica, wherein less than the stoichiometric amount of said acidic material, which would be required to completely neutralize the alkali metal oxide which is present in said alkali metal silicate solution, is added to said alkali metal silicate solution, and wherein said zinc salt is added to the solution formed by the adding of said acidic material to said alkali metal silicate solution after the precipitation of silica from said alkali metal silicate solution is substantially complete.

9. A composition in accordance with claim 8 wherein said alkali metal silicate solution is stirred while said suitable acidic material is added to said alkali metal silicate solution, wherein said alkali metal silicate solution is maintained at a temperature in the range of about 25° C. to about 100° C. while said suitable acidic material is being added to said alkali metal silicate solution, wherein the solution formed by the adding of said acidic material to said alkali metal silicate solution is stirred while the suitable zinc salt is added to the solution formed by the adding of said acidic material to said alkali metal silicate solution and wherein the solution formed by the adding of said acidic material to said alkali metal silicate solution is maintained at a temperature in the range of about 25° C. to about 100° C. while said suitable zinc salt is added to the solution formed by the adding of said acidic material to said alkali metal silicate solution.

10. A composition in accordance with claim 8 wherein said alkali metal silicate solution is stirred while said suitable acidic material is added to said alkali metal silicate solution, wherein said alkali metal silicate solution is maintained at a temperature in the range of about 80° C. to about 100° C. while said suitable acidic material is being added to said alkali metal silicate solution, wherein the solution formed by the adding of said acidic material to said alkali metal silicate solution is stirred while the suitable zinc salt is added to the solution formed by the adding of said acidic material to said alkali metal silicate solution and wherein the solution formed by the adding of said acidic material to said alkali metal silicate solution is maintained at a temperature in the range of about 80° C. to about 100° C. while said suitable zinc salt is added to the solution formed by the adding of said acidic material to said alkali metal silicate solution.

11. A composition in accordance with claim 8 wherein the steps of forming said zinc modified silica additionally comprise:
heating the solution containing said zinc modified silica to a temperature in the range of about 80° C. to about 100° C. for a time period in the range of about 30 minutes to about 2 hours after the addition of said suitable zinc salt is completed;
recovering said zinc modified silica from the solution containing said zinc modified silica; and
washing the thus recovered zinc modified silica.

12. A composition in accordance with claim 8 wherein said rubbery composition additionally comprises a sulfur containing organo-silicon reinforcing promoter.

13. A composition in accordance with claim 12 wherein said rubbery composition additionally comprises a rubber extender oil, a vulcanizing agent, at least one accelerator and at least one activator.

* * * * *